(12) United States Patent  (10) Patent No.: US 8,830,402 B2
Lin et al.  (45) Date of Patent:  *Sep. 9, 2014

(54) IMAGE PROCESSING CIRCUIT AND METHOD THEREOF

(71) Applicant: Novatek Microelectronics Corp., Hsinchu (TW)

(72) Inventors: Teng-Yi Lin, Kaohsiung County (TW); Wei-Fu Chen, Taipei County (TW); Wei-Jen Lo, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,966

(22) Filed: Sep. 25, 2013

(65) Prior Publication Data

US 2014/0028919 A1  Jan. 30, 2014

Related U.S. Application Data

(63) Continuation of application No. 12/719,012, filed on Mar. 8, 2010, now Pat. No. 8,570,443.

(30) Foreign Application Priority Data

Jun. 11, 2009 (TW) .............................. 98119588 A

(51) Int. Cl.
 *H04N 9/74*  (2006.01)

(52) U.S. Cl.
 USPC ........... 348/581; 348/607; 348/620; 348/606; 348/625; 348/441; 348/477; 348/478; 348/479; 345/660; 345/558; 345/472; 345/472.2; 382/298

(58) Field of Classification Search
 USPC ......... 348/581, 607, 620, 606, 625, 441, 477, 348/478, 479; 345/660, 472, 472.2, 558; 382/298

See application file for complete search history.

(56) References Cited

U.S. PATENT DOCUMENTS

| | | | | |
|---|---|---|---|---|
| 4,941,185 A | * | 7/1990 | Reed | 382/267 |
| 5,313,301 A | * | 5/1994 | Lee | 348/607 |
| 5,416,532 A | * | 5/1995 | Ko | 348/665 |
| 5,432,563 A | * | 7/1995 | Kasahara | 348/629 |
| 5,513,016 A | * | 4/1996 | Inoue | 358/3.26 |
| 5,596,418 A | * | 1/1997 | Strolle et al. | 386/304 |
| 5,739,867 A | * | 4/1998 | Eglit | 348/581 |
| 5,790,205 A | * | 8/1998 | Pettitt et al. | 348/629 |
| 6,094,226 A | * | 7/2000 | Ke et al. | 348/446 |
| 6,151,079 A | * | 11/2000 | Nagata et al. | 348/581 |

(Continued)

*Primary Examiner* — Jefferey Harold
*Assistant Examiner* — Mustafizur Rahman
(74) *Attorney, Agent, or Firm* — Jianq Chyun IP Office

(57) ABSTRACT

An image processing circuit and a method thereof are provided herein. The image processing circuit has a first scaling circuit, one or more line buffers, a first sharpness circuit, a second scaling circuit, and a second sharpness circuit. The first scaling circuit enlarges an input image along a first direction to generate a first enlarged image. The one or more line buffers temporarily store the pixel values of a plurality of pixel rows of the first enlarged image. The first sharpness circuit vertically sharpens the first enlarged image to generate a first sharpened image. The second scaling circuit enlarges the first sharpened image along a second direction to generate a second enlarged image. The second sharpness circuit horizontally sharpens the second enlarged image to generate a second sharpened image. Accordingly, it is possible to use the one or more line buffers having shorter data lengths to perform the vertical sharpening.

12 Claims, 7 Drawing Sheets

(56) References Cited

U.S. PATENT DOCUMENTS

| | | | |
|---|---|---|---|
| 6,441,857 B1* | 8/2002 | Wicker et al. | 348/441 |
| 6,587,602 B2* | 7/2003 | Wakisawa et al. | 382/298 |
| 6,765,563 B2* | 7/2004 | Eglit et al. | 345/213 |
| 7,133,053 B2* | 11/2006 | Chen | 345/660 |
| 7,349,032 B2* | 3/2008 | Iga et al. | 348/581 |
| 7,359,007 B2* | 4/2008 | Wu | 348/581 |
| 7,385,616 B2* | 6/2008 | Tseng et al. | 345/660 |
| 7,609,326 B2* | 10/2009 | Jen et al. | 348/581 |
| 7,671,924 B2* | 3/2010 | Chao et al. | 348/581 |
| 8,139,091 B2* | 3/2012 | Wu | 345/698 |
| 8,139,898 B2* | 3/2012 | Chuang et al. | 382/299 |
| 8,208,760 B2* | 6/2012 | Wu | 382/299 |
| 8,330,868 B2* | 12/2012 | Suzuki et al. | 348/607 |
| 2003/0090592 A1* | 5/2003 | Callway et al. | 348/581 |
| 2005/0163389 A1* | 7/2005 | Ohmi et al. | 382/253 |
| 2007/0041662 A1* | 2/2007 | Jeffrey | 382/298 |

* cited by examiner

IMAGE PROCESSING CIRCUIT AND METHOD THEREOF

CROSS-REFERENCE TO RELATED APPLICATION

This application is a continuation application of and claims the priority benefit of U.S. application Ser. No. 12/719,012, filed on Mar. 8, 2010, now allowed, which claims the priority benefit of Taiwan application serial No. 98119588, filed on Jun. 11, 2009. The entirety of each of the above-mentioned patent applications is hereby incorporated by reference herein and made a part of this specification.

BACKGROUND OF THE INVENTION

1. Field of Invention

The present invention relates to an image processing circuit and method. More particularly, the present invention relates to an image processing circuit and method that can scale and sharpen images.

2. Description of Related Art

The advancements in the manufacturing process have made high resolution monitors become more and more popular. High resolution monitors can display more image details clearly. Taking a monitor compatible with the High Definition Multimedia Interface (HDMI) standard, the monitor can display images with a 1920×1080 resolution. Those images with the resolution of 1920×1080 are frequently referred to as High Definition (HD) images.

However, most TV programs can only provide images with a resolution of 320×240. Similarly, DVD programs can only provide images with a resolution of 720×480, which is referred to as Stand Definition (SD). When a monitor having a high resolution (e.g. HD) is used to display a TV program or a DVD program, the monitor has to enlarge the images of the program. Because the enlarged images will have relatively obscure object borders, observers will discern deteriorations in the quality of the enlarged images. Therefore, image sharpening is usually performed upon the enlarged images to enhance the sharpness of the enlarged images.

Please refer to FIG. 1, which is a block diagram of an image processing circuit 10 of the related art. The image processing circuit 10 is used to enlarge and sharpen an input image $I_{IN}$ to generate a sharpened image $I_S$. The image processing circuit 10 includes a scaling circuit 12 and a sharpness circuit 14. The scaling circuit 12 enlarges the input image $I_{IN}$ to generate an enlarged image $I_P$. Then, the sharpness circuit 14 sharpens the enlarged image $I_P$ to generate the sharpened image $I_S$.

For simplicity of illustration, when this text indicates that an image has a resolution of U×V, it means that the horizontal resolution of the image is U pixels, and the vertical resolution of the image is V pixels. For example, assume that the resolution of the input image $I_{IN}$ is 720×480. The horizontal resolution of the input image $I_{IN}$ is 720 pixels, and the vertical resolution of the input image $I_{IN}$ is 480 pixels. Please note that each of the aforementioned pixels can consist of either a single sub-pixel or a plurality of sub-pixels. Each of the sub-pixels represents a specific color, such as red, green, or blue.

Please refer to FIG. 2, which is a diagram illustrating the input image $I_{IN}$, the enlarged image $I_P$, and the sharpened image $I_S$ of FIG. 1. Assume that the input image $I_{IN}$ with the resolution of 720×480 is to be converted into the sharpened image $I_S$ with the resolution of 1920×1080. The scaling circuit 12 first enlarges the input image $I_{IN}$ to generate the enlarged image $I_P$ with the resolution of 1920×1080. Next, the sharpness circuit 14 sharpens the enlarged image $I_P$ to generate the sharpened image $I_S$ with the resolution of 1920×1080.

When the resolution of the sharpened image $I_S$ increases, to maintain the quality of the sharpened image $I_S$, the sharpness circuit 14 must have more taps. However, if the sharpness circuit 14 has more taps, the line buffers 18 must also have larger storage capacities. For example, assume that (1) the input image $I_{IN}$ with the resolution of 720×480 is to be converted into the sharpened image $I_S$ with the resolution of 1920×1080; (2) the sharpness circuit 14 performs a 7-tap sharpening; (3) each pixel has three sub-pixels corresponding to colors red, green, and blue; and (4) each sub-pixel has 256 (i.e. $2^8$) gray levels. To facilitate the 7-tap sharpening, the image processing circuit 10 should have at least 6 line buffers 18, each of which should be capable of storing at least 5760 (i.e. 1920×3) bytes.

SUMMARY OF THE INVENTION

Accordingly, the present invention is directed to provide an image processing circuit for performing vertical scaling, vertical sharpening, horizontal scaling, and horizontal sharpening on an image in turn. The image processing circuit can use line buffers with a shorter data length to perform the vertical sharpening.

The present invention provides an image processing method for performing vertical scaling, vertical sharpening, horizontal scaling, and horizontal sharpening on an image in turn. The vertical sharpening of the method can be performed with more taps without requiring line buffers of longer data lengths.

The present invention provides an image processing circuit for processing an input image. The image processing circuit includes a first scaling circuit, a first sharpness circuit, a second scaling circuit, and a second sharpness circuit. The first scaling circuit enlarges the input image along a first direction to generate a first enlarged image. The first sharpness circuit is coupled to the first scaling circuit, and vertically sharpens the first enlarged image to generate a first sharpened image. The second scaling circuit is coupled to the first sharpness circuit, and enlarges the first sharpened image along a second direction to generate a second enlarged image. The second sharpness circuit is coupled to the second scaling circuit, and horizontally sharpens the second enlarged image to generate a second sharpened image.

The present invention provides an image processing method for processing an input image. The method includes: increasing a first resolution of the input image along a first direction to generate a first enlarged image; sharpening the first enlarged image along a second direction to generate a first sharpened image; increasing a second resolution of the first sharpened image along a third direction to generate a second enlarged image by utilizing a second scaling circuit of the image processing circuit; and sharpening the second enlarged image along a fourth direction to generate a second sharpened image According to an embodiment of the present invention, the first direction is the vertical direction, and the second direction is the horizontal direction.

According to an embodiment of the present invention, the image processing circuit further includes a buffer. The buffer is coupled to the first scaling circuit and the first sharpness circuit, and temporally stores the pixel values of a part of pixels of the first enlarged image.

According to an embodiment of the present invention, the buffer includes a plurality of line buffers.

The present invention provides an image processing circuit for processing an input image. The image processing circuit includes a first scaling circuit, a plurality of line buffers, a first sharpness circuit, a second scaling circuit, and a second sharpness circuit. The first scaling circuit vertically enlarges the input image to generate a first enlarged image. The line buffers are coupled to the first scaling circuit, and temporally store the pixel values of a plurality of pixel rows of the first enlarged image. The first sharpness circuit is coupled to the line buffers and vertically sharpens the first enlarged image to generate a first sharpened image. The second scaling circuit is coupled to the first sharpness circuit and horizontally enlarges the first sharpened image to generate a second enlarged image. The second sharpness circuit is coupled to the second scaling circuit, and horizontally sharpens the second enlarged image to generate a second sharpened image.

The present invention provides an image processing method for processing an input image. The image processing method includes: inputting the input image to an image processing circuit; vertically enlarging the input image to generate a first enlarged image by utilizing a first scaling circuit of the image processing circuit; temporally storing the pixel values of a plurality of pixel rows of the first enlarged image into a plurality of line buffers; vertically sharpening the first enlarged image to generate a first sharpened image by utilizing a first sharpness circuit of the image processing circuit; horizontally enlarging the first sharpened image to generate a second enlarged image by utilizing a second scaling circuit of the image processing circuit; and horizontally sharpening the second enlarged image to generate a second sharpened image by utilizing a second sharpness circuit of the image processing circuit.

According to an embodiment of the present invention, when vertically sharpening the first enlarged image, the first sharpness circuit reads the pixel values of a pixel column of the first enlarged image from the line buffers, and calculates the pixel value of a corresponding pixel of the first sharpened image according to the pixel values of the pixel column.

According to an embodiment of the present invention, when horizontally sharpening the second enlarged image, the second sharpness circuit calculates the pixel value of a corresponding pixel of the second sharpened image according to the pixel values of a pixel row of the second enlarged image.

According to an embodiment of the present invention, the horizontal resolution of the first enlarged image is equal to the horizontal resolution of the input image. The vertical resolution of the first enlarged image is larger than the vertical resolution of the input image.

According to an embodiment of the present invention, the vertical resolution of the second enlarged image is equal to the vertical resolution of the first sharpened image. The horizontal resolution of the second enlarged image is larger than the horizontal resolution of the first sharpened image.

According to an embodiment of the present invention, the first enlarged image and the first sharpened image have the same resolution. The second enlarged image and the second sharpened image have the same resolution.

According to an embodiment of the present invention, the data length of each of the line buffers is equal to the data volume of the pixel values of a pixel row of the first enlarged image.

According to an embodiment of the present invention, the line buffers are first-in first-out (FIFO) buffers.

The present invention divides the image scaling into a vertical scaling and a horizontal scaling, and divides the image sharpening into a vertical sharpening and a horizontal sharpening. The vertical sharpening is performed after the vertical scaling and before the horizontal scaling. Therefore, the image processing circuit of the present invention can use line buffers with a shorter data length to perform the vertical sharpening. The image processing circuit can perform the vertical sharpening with more taps without requiring line buffers of longer data lengths.

In order to the make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
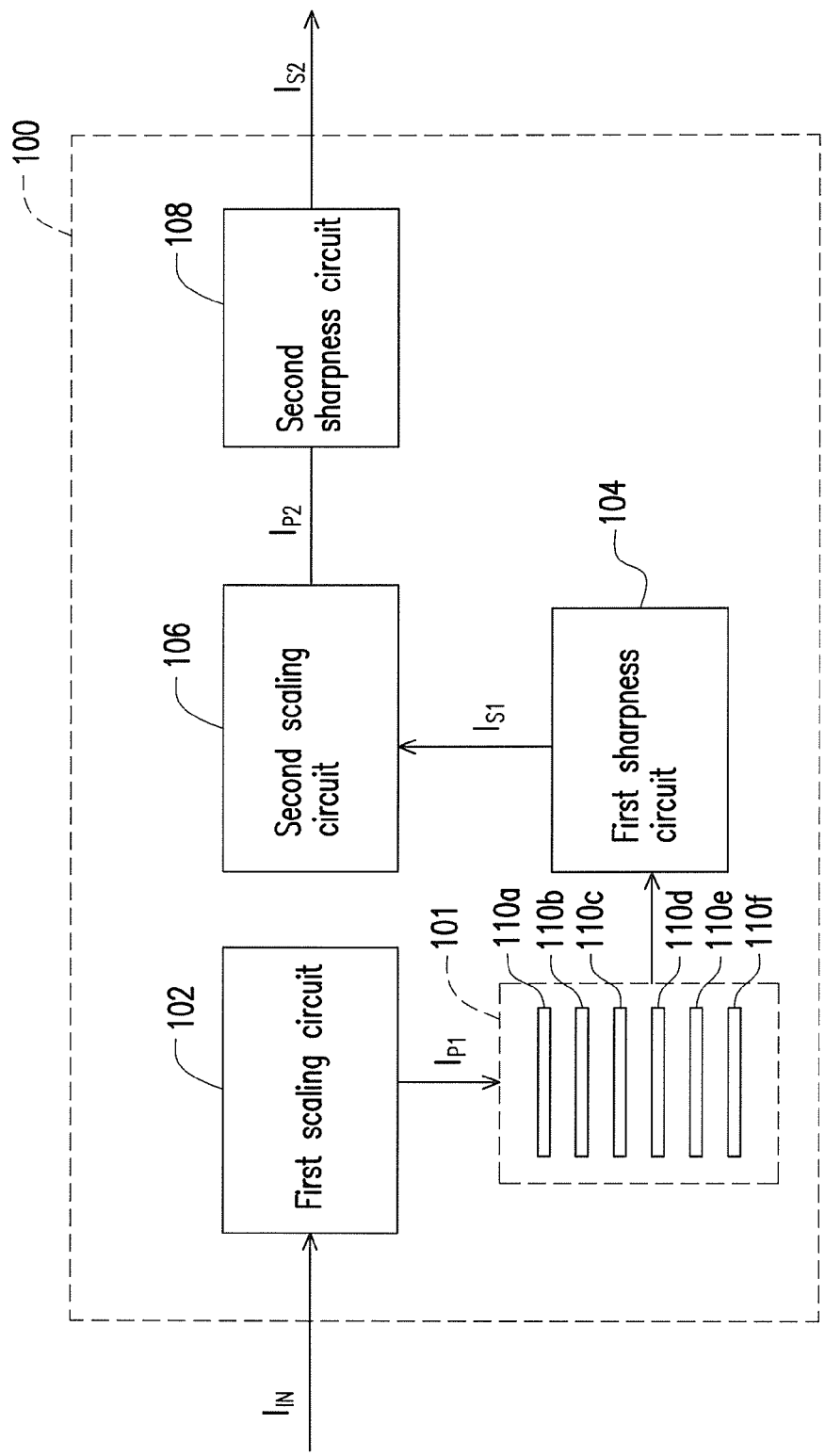
FIG. 3 is a block diagram of an image processing circuit according to an embodiment of the present invention.
Figure 4:
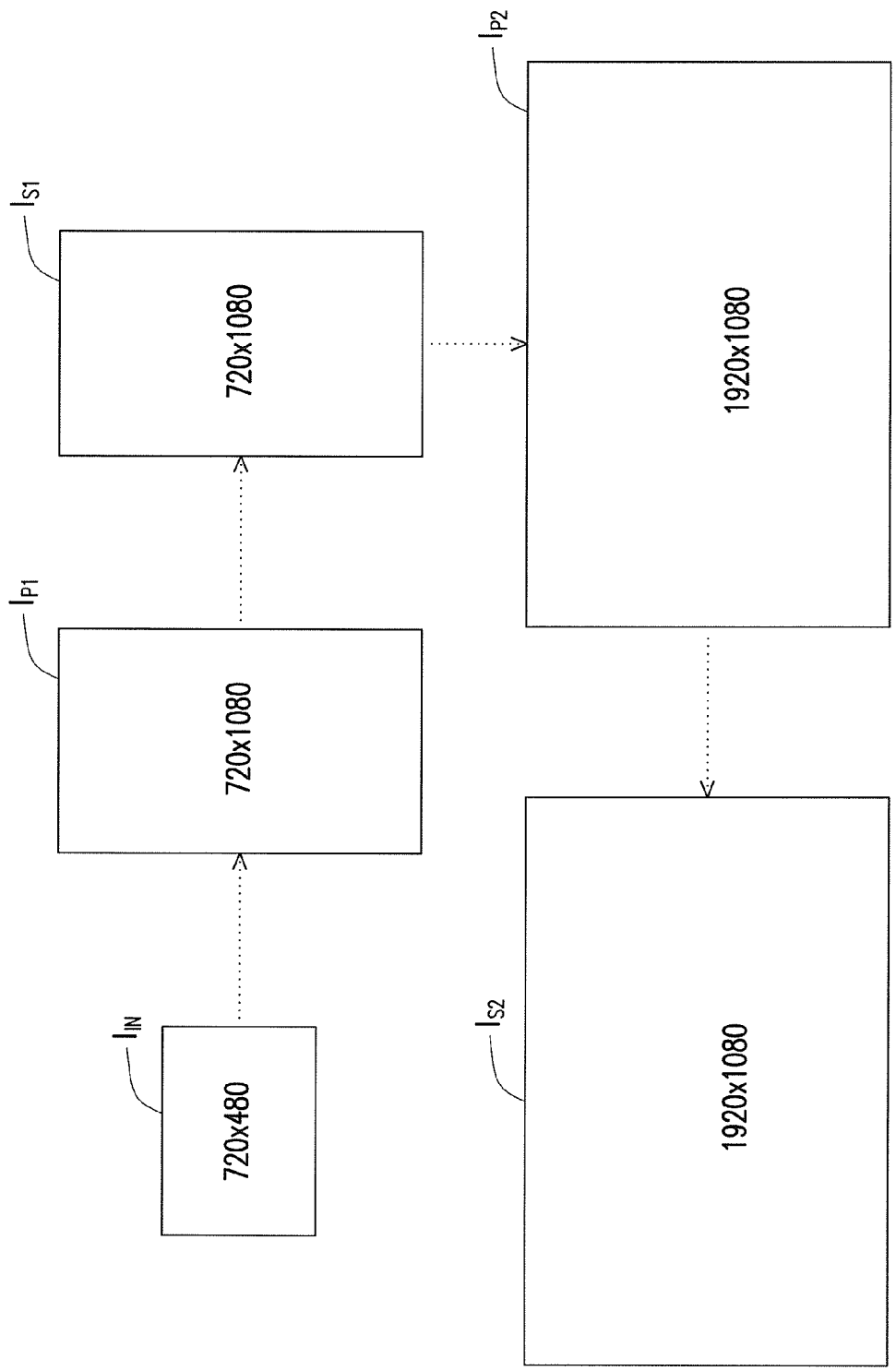
FIG. 4 is a diagram illustrating the images generated by the image processing circuit of FIG. 3 while processing the input image.

Please refer to FIG. 3 and FIG. 4. FIG. 3 is a block diagram of an image processing circuit 100 according to an embodiment of the present invention. FIG. 4 is a diagram illustrating the images generated by the image processing circuit 100 of FIG. 3 while processing an input image $I_{IN}$. The image processing circuit 100 processes the input image $I_{IN}$ to generate an output image that is not only enlarged but also sharpened. The image processing circuit 100 includes a first scaling circuit 102, a first sharpness circuit 104, a second scaling circuit 106, and second sharpness circuit 108. The following example illustrates not only the image processing circuit 100 but also an embodiment of an image processing method of the present invention. In the following example, it is assumed that the input image $I_{IN}$ with a resolution of 720×480 is to be converted into a second sharpened image $I_{S2}$ with a resolution of 1920×1080. Please note that these exemplary resolutions are not necessary limitations of the present invention. For example, the image processing circuit 100 can also be used to convert an input image $I_{IN}$ with a resolution of 320×240 into a second sharpened image $I_{S2}$ with a resolution of 720×480 or 1920×1080.

The first scaling circuit 102 enlarges the input image $I_{IN}$ to generate a first enlarged image $I_{P1}$. Specifically, the first scaling circuit 102 enlarges the input image $I_{IN}$ along a first direction to generate the first enlarged image $I_{P1}$. In this embodiment, the first direction is the vertical direction. In other words, the first scaling circuit 102 vertically enlarges the input image $I_{IN}$ to generate the first enlarged image $I_{P1}$, which has a vertical resolution larger than that of the input image $I_{IN}$. In the example shown in FIG. 4, the input image $I_{IN}$ has a resolution of 720×480. After the vertical scaling, the first enlarged image $I_{P1}$ has a resolution of 720×1080. Specifically, the vertical resolution of the first enlarged image $I_{P1}$ is larger than the vertical resolution of the input image $I_{IN}$, the horizontal resolution of the first enlarged image $I_{P1}$ is equal to the horizontal resolution of the input image $I_{IN}$.

In this embodiment, the first scaling circuit 102 interpolates one or more than one row of pixels into each two adjacent rows of the input image $I_{IN}$. Please note that interpolation is not a necessary limitation of the present invention. Other image scaling method can also be used with the present invention to enlarge the input image $I_{IN}$ to generate the first enlarged image $I_{P1}$.

In this embodiment, the image processing circuit 100 further includes a buffer 101. The buffer 101 is coupled to the first scaling circuit 102 and the first sharpness circuit 104. The buffer 101 temporally stores the pixel values of a part of pixels on the first enlarged image $I_{P1}$. In this embodiment, the buffer 101 includes a plurality of line buffers 110a-110f. The line buffers 110a-110f are coupled to the first scaling circuit 102. The line buffers 110a-110f temporally stores the pixel values of a plurality of pixel rows of the first enlarged image $I_{P1}$. The first sharpness circuit 104 can fetch the temporally stored pixel values for subsequent image processing. In addition, in this embodiment, the data length of each of the line buffers 110a-110f is equal to the data volume of the pixel values of a pixel row of the first enlarged image $I_{P1}$. Since in this example the resolution of the first enlarged image $I_{P1}$ is 720×480, there are 480 pixel rows in the first enlarged image $I_{P1}$, each of the pixel rows has 720 pixels. In the circumstances, the data length of each of the line buffers 110a-110f can be equal to the data volume of the pixel values of 720 pixels. Specifically, assume that each pixel has three colors, including red, green, and blue, and each of the colors has 256 (i.e. $2^8$) gray levels. The data volume of the pixel values of each pixel will be 3 bytes. The data length of each of the line buffers 110a-110f can be 2160 (i.e. 720×3) bytes. Please note that the exemplary data lengths of the line buffers 110a-110f do not constitute a necessary limitation of the present invention.

Please refer to FIG. 3 and FIG. 4. The first sharpness circuit 104 is coupled to the line buffers 110a-110f. The first sharpness circuit 104 performs a vertical sharpness procedure, which is also referred to as a first sharpness procedure, on the first enlarged image $I_{P1}$ to generate a first sharpened image $I_{S1}$. The resolution of the first sharpened image $I_{S1}$ is equal to the resolution of the first enlarged image $I_{P1}$. In the example shown in FIG. 4, because the resolution of the first enlarged image $I_{P1}$ is 720×1080, the resolution of the first sharpened image $I_{S1}$ is also 720×1080. In addition, the pixel values of each pixel of the first enlarged image $I_N$ will be temporally stored into the line buffers 110a-110f in turn. When vertically sharpening the first enlarged image $I_{P1}$, the first sharpness circuit 104 fetches the pixel values of the required pixels of the first enlarged image $I_{P1}$ from the line buffers 110a-110f to calculate the pixel values of each pixel of the first sharpened image $I_{S1}$.

The second scaling circuit 106 is coupled to the first sharpness circuit 104. In this embodiment, the second scaling circuit 106 enlarges the first sharpened image $I_{S1}$ along a second direction to generate a second enlarged image $I_{P2}$. In this embodiment, the second direction is the horizontal direction, which is perpendicular to the aforementioned first direction. In other words, the second scaling circuit 106 horizontally enlarges the first sharpened image $I_{S1}$ to generate the second enlarged image $I_{P2}$, the horizontal resolution of which is larger than the horizontal resolution of the first sharpened image $I_{S1}$. In the example shown in FIG. 4, the resolution of the first sharpened image $I_{S1}$ is 720×1080, the resolution of the second enlarged image $I_{P2}$ is 1920×1080. Specifically, the horizontal resolution of the second enlarged image $I_{P2}$ is larger than the horizontal resolution of the first sharpened image $I_{S1}$, the vertical resolution of the second enlarged image $I_{P2}$ is equal to the vertical resolution of the first sharpened image $I_{S1}$.

In this embodiment, the second scaling circuit 106 interpolates one or more than one pixel column into each two adjacent pixel columns of the first sharpened image $I_{S1}$. Please note that interpolation is not a necessary limitation of the present invention. Other image scaling method can also be used with the present invention to enlarge the first sharpened image $I_{S1}$ to generate the second enlarged image $I_{P2}$.

The second sharpness circuit 108 is coupled to the second scaling circuit 106. The second sharpness circuit 108 performs a horizontal sharpness procedure, which is also referred to as a second sharpness procedure, on the second enlarged image $I_{P2}$ to generate the second sharpened image $I_{S2}$. The resolution of the second sharpened image $I_{S2}$ is equal to the resolution of the second enlarged image $I_{P2}$. In the example shown in FIG. 4, because the resolution of the second enlarged image $I_{P2}$ is 1920×1080, the resolution of the second sharpened image $I_{S2}$ is also 1920×1080.

Figure 1:
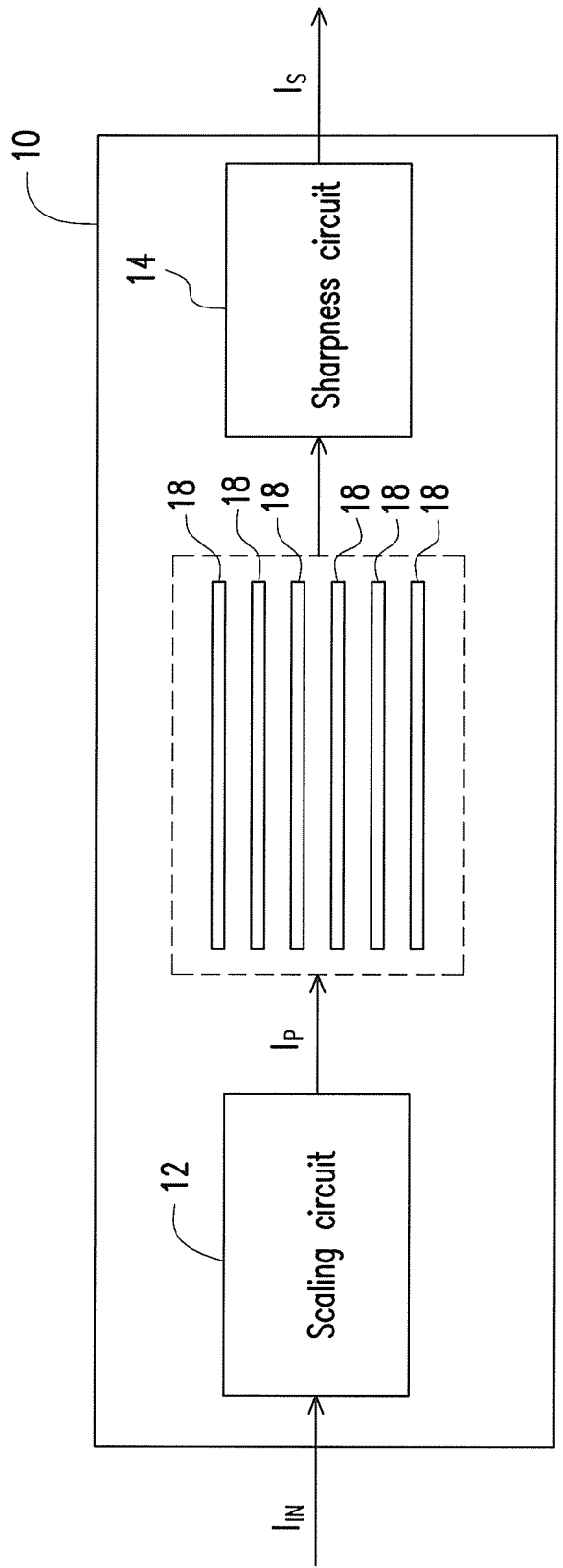
FIG. 1 is a block diagram of an image processing circuit of the related art.
Figure 2:
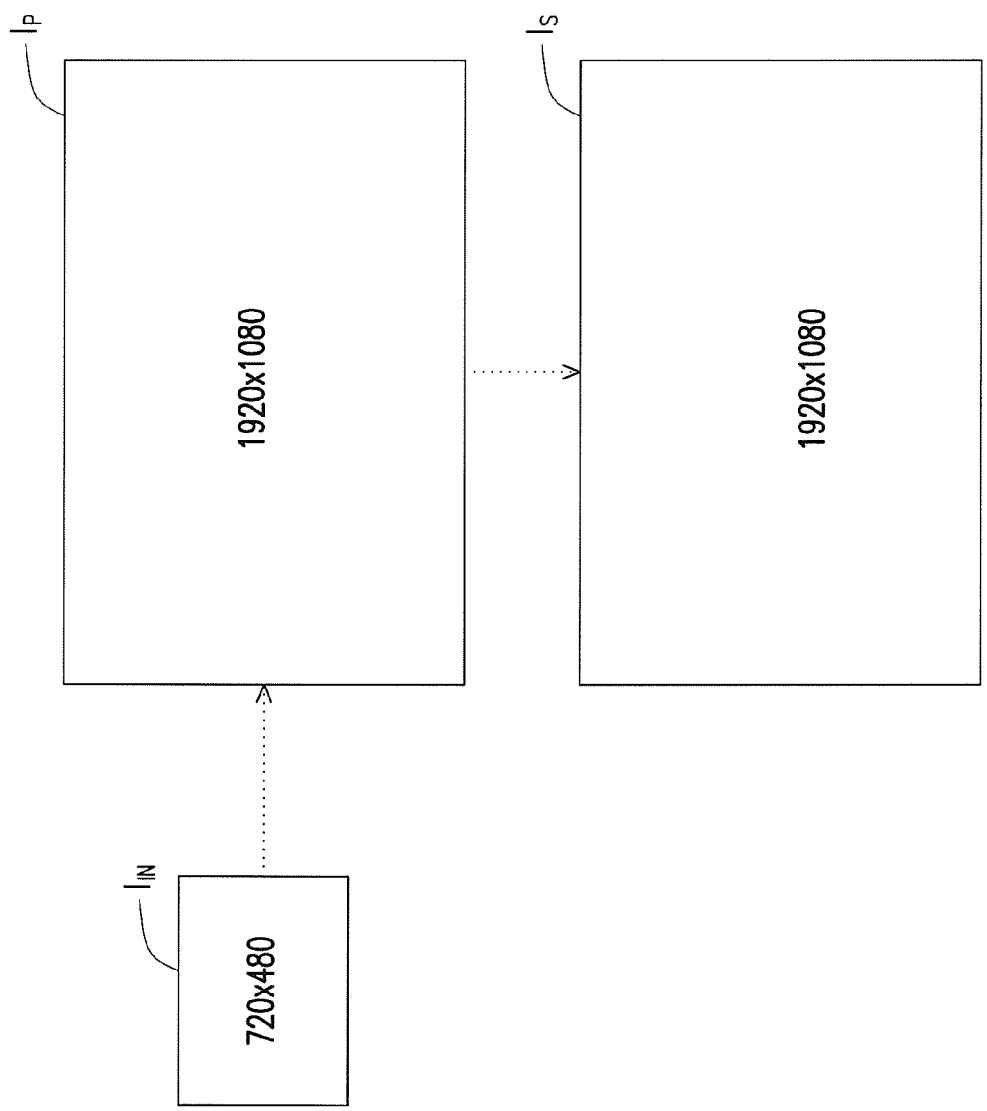
FIG. 2 is a diagram illustrating the input image, the enlarged image, and the sharpened image shown in FIG. 1.

In this embodiment, the image processing circuit 100 has six line buffers 110a-110f, which temporally store the pixel values of six pixel rows of the first enlarged image $I_{P1}$. Accordingly, the first sharpness circuit 104 can performs a 7-tap vertical sharpening on the first enlarged image $I_{P1}$. In addition, in this embodiment, the data length of each of the line buffers 110a-110f is equal to 2160 bytes. In contrast to the image processing circuit 10 of FIG. 1, the image processing method of the present invention permits a vertical sharpening of the same number of taps by using line buffers of shorter data lengths. Therefore, the image processing circuit of the present invention has a lower manufacturing cost. If the image processing circuit of the present invention uses line buffers having the same, rather than shorter, data lengths, the image processing circuit of the present invention can performs a vertical sharpening of more taps.

Figure 5:
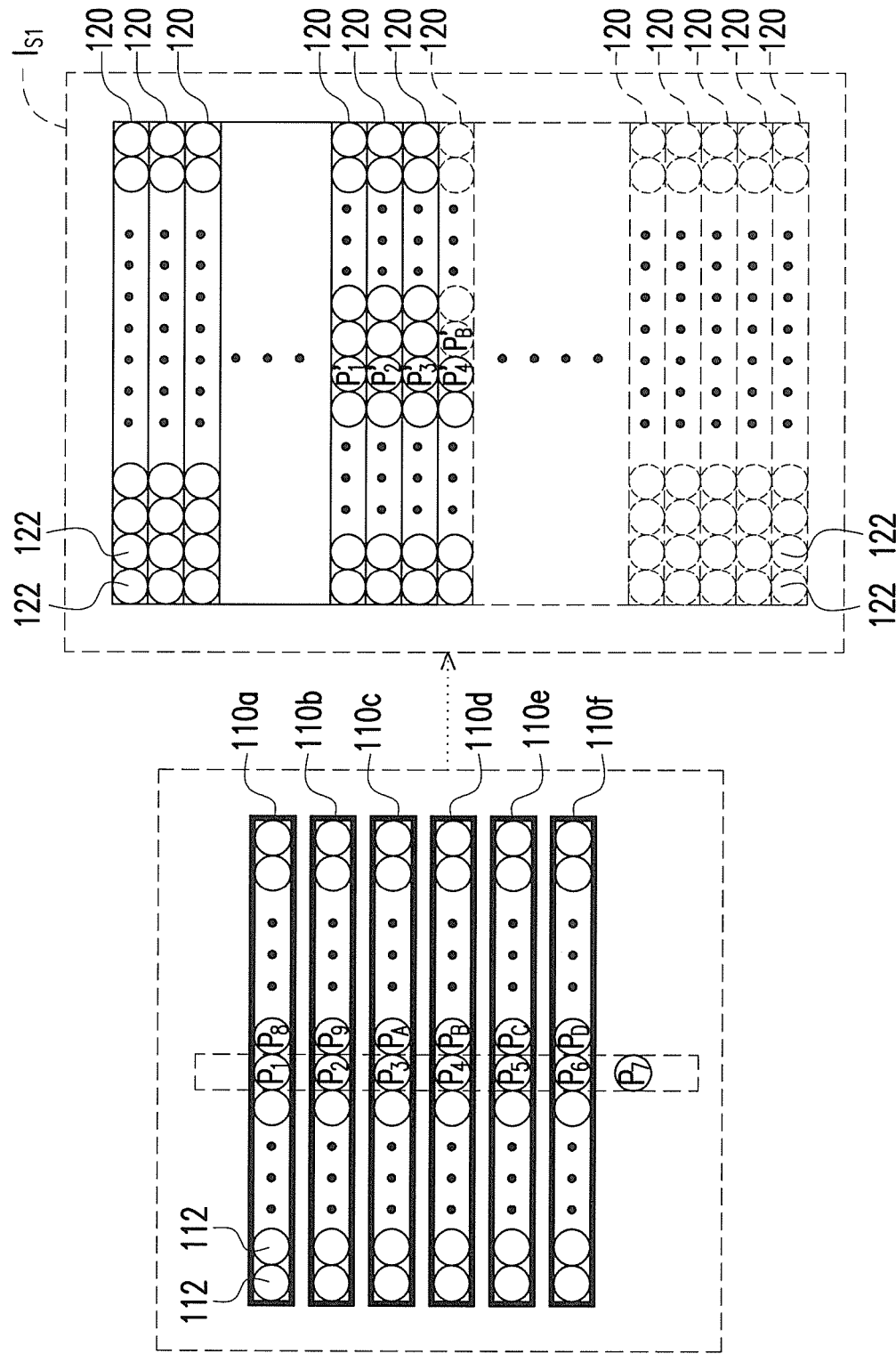
FIG. 5 is a diagram illustrating how the first sharpness circuit of FIG. 3 vertically sharpens the first enlarged image to generate the first sharpened image.

Please refer to FIG. 5, which is a diagram illustrating how the first sharpness circuit of FIG. 3 vertically sharpens the first enlarged image to generate the first sharpened image. As mentioned, the buffers 110a-110f temporally stores the pixel values of a plurality of pixel rows of the first enlarged image $I_{P1}$. The stored pixel values are to be used by the first sharpness circuit 104. As indicated by FIG. 5, each of the six line buffers 110a-110f temporally stores the pixel values of pixels 112 of a pixel row of the first enlarged image $I_{P1}$. Since in this embodiment the resolution of the first sharpened image $I_{S1}$ is 720×1080, the first sharpened image $I_{S1}$ has 1080 pixel rows of pixels 122. The data length of each of the line buffers 110a-110f is equal to the data volume of all the pixels 122 in a single pixel row 120. In other words, each of the line buffers 110a-110f can store the pixel values of 720 pixels.

When vertically sharpening the first enlarged image $I_{P1}$, the first sharpness circuit 104 fetches from the line buffers 110a-110f the pixel values of a plurality of pixels in a single pixel column of the first enlarged image $I_{P1}$. Based on the fetched pixel values, the first sharpness circuit 104 calculates the pixel value of a corresponding pixel of the first sharpened image $I_{S1}$. Furthermore, when the first scaling circuit 102 is generating the first enlarged image $I_{P1}$, the first sharpness circuit 104 can simultaneously calculates the pixel values of some pixels of the first sharpened image $I_{S1}$ according to the already-generated pixel values of a part of pixels of the first enlarged image $I_{P1}$. Please refer to FIG. 5, pixel $P_4'$ is the one that the first sharpness circuit 104 is processing. The pixels 122 ahead of the pixel $P_4'$, which are represented by circles of real-lines, are the pixels that have been processed by the first sharpness circuit 104 already. The pixels 122 behind the pixel $P_4'$, which are represented by circles of dotted-lines, are the pixels that are going to be processed by the first sharpness circuit 104. The first sharpness circuit 104 calculates the pixels values of the pixels 122 of the first sharpened image $I_{S1}$ according to the pixel values stored in the line buffers on the go. For example, the first sharpness circuit 104 calculates the pixel value of the pixel $P_4'$ according to the pixel value of the pixel $P_7$ and the pixel values of the pixels $P_1$, $P_2$, $P_3$, $P_4$, $P_5$, and $P_6$ stored in the line buffers 110a-110f, respectively. The pixel $P_7$ is the pixel just generated by the first scaling circuit 102. The locations of the pixels $P_1$, $P_2$, $P_3$, and $P_4$ on the first enlarged image $I_{P1}$ corresponds to the locations of the pixels $P_1'$, $P_2'$, $P_3'$, and $P_4'$ on the first sharpened image $I_{S1}$. In addition, the pixels $P_1$, $P_2$, $P_3$, $P_4$, $P_5$, $P_6$, and $P_7$ locate on the same column of the first enlarged image $I_{P1}$.

Figure 6:
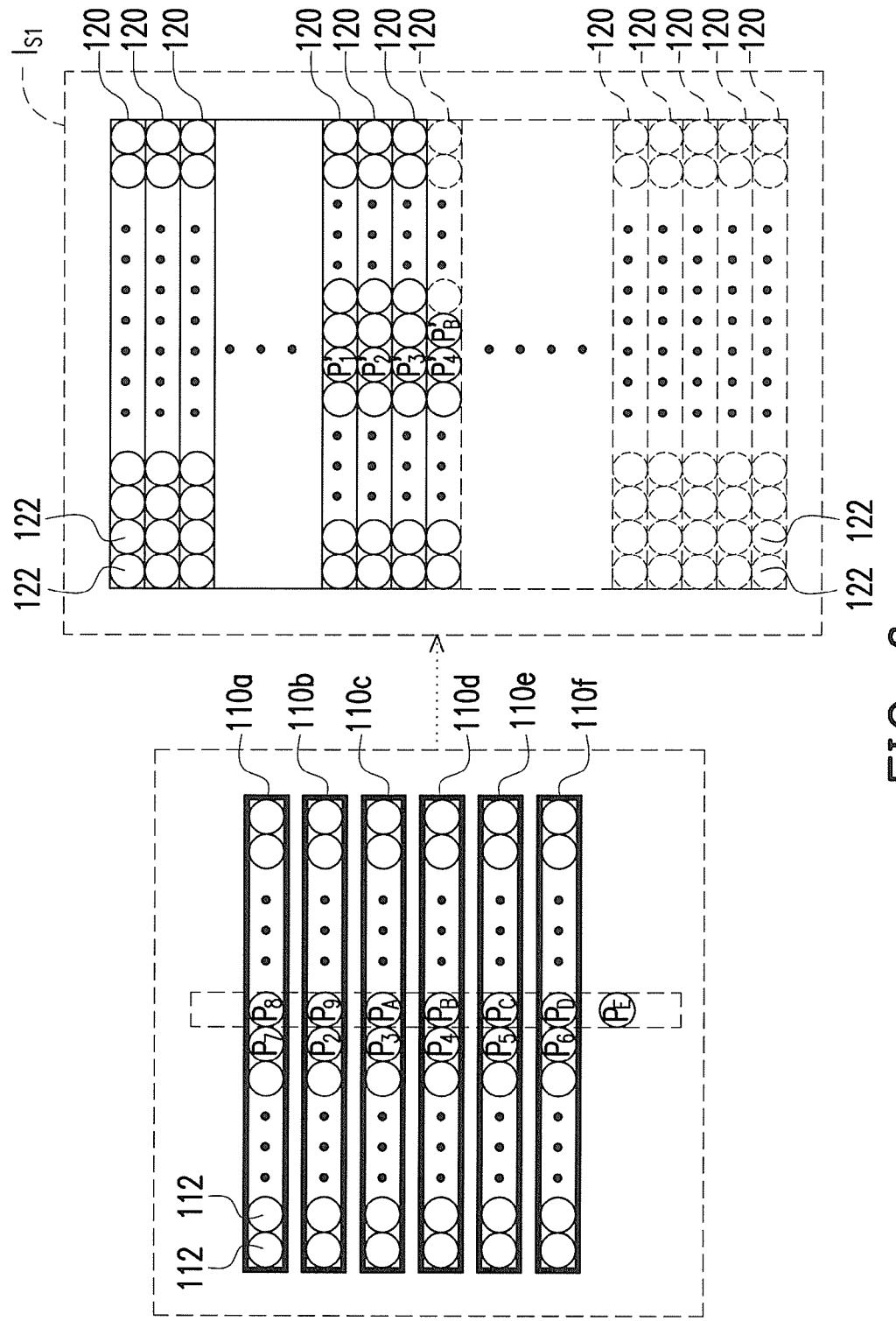
FIG. 6 is a diagram illustrating the status of the line buffers and the first sharpened image after the first sharpness circuit has finished calculating the pixel value of a pixel of the first sharpened image.

In this embodiment, the line buffers 110a-110f are first-in first-out (FIFO) buffers. In other words, the earliest stored pixel values will be first replaced by the pixel values newly generated by the first scaling circuit 102. Please refer to FIG. 6 and FIG. 5. FIG. 6 is a diagram illustrating the status of the line buffers 110a-110f and the first sharpened image $I_{S1}$ after the first sharpness circuit has finished calculating the pixel value of the pixel $P_4'$. As is shown in FIG. 6, the space of the line buffer 110a originally stored the pixel value of the pixel $P_1$ will be used to store the pixel value of the pixel $P_7$. In other words, after the pixel value of the pixel $P_4'$ are calculated, the pixel value of the pixel $P_1$ will be replaced by the pixel value of the pixel $P_7$. Afterward, the first sharpness circuit 104 proceeds to calculate the pixel values of the pixels 122 behind the pixel $P_4'$. For example, to calculate the pixel value of the pixel $P_B'$, the first sharpness circuit 104 uses the pixel value of the pixel $P_E$ and the pixel value of the pixel $P_8$, $P_9$, $P_A$, $P_B$, $P_C$, and $P_D$ stored in the line buffers 110a-110f. The pixel $P_E$ is the pixel just generated by the first scaling circuit 102. The location of the pixel $P_{B'}$ on the first sharpened image $I_{S1}$ corresponds to the location of the pixel $P_B$ on the first enlarged image $I_{P1}$. In addition, the pixels $P_8$, $P_9$, $P_A$, $P_B$, $P_C$, $P_D$, and $P_E$ locate on the same pixel column of the first enlarged image $I_{P1}$.

As mentioned, when vertically sharpening the first enlarged image, the first sharpness circuit 104 fetches the pixel values of a plurality of pixels on a single pixel column of the first enlarged image $I_{P1}$ from the line buffers 110a-110f. According to the fetched pixel values, the first sharpness circuit 104 calculates the pixel value of a corresponding pixel of the first sharpened image $I_{S1}$. In other words, the first sharpness circuit 104 calculates the pixel values of the pixels 122 on the first pixel column of the first sharpened image $I_{S1}$ according to the pixel values of the pixels 112 on the first pixel column of the first enlarged image $I_{P1}$. The first sharpness circuit 104 calculates the pixel values of the pixels 122 on the second pixel column of the first sharpened image $I_{S1}$ according to the pixel values of the pixels 112 on the second pixel column of the first enlarged image $I_{P1}$. And so on.

In the aforementioned embodiment, the first sharpness circuit 104 calculated the pixel value of a corresponding pixel of the first sharpened image $I_{S1}$ according to the pixel value of the pixel just generated by the first scaling circuit 102 and the pixel values stored in the line buffers 110a-110f. In another embodiment of the present invention, the image processing circuit 100 can include another line buffer in addition to the line buffers 110a-110f. The additional line buffer temporally stores the pixel values of another row of pixels 112 of the first enlarged image $I_{P1}$. With the additional line buffer, the first sharpness circuit 104 can calculate the pixel value of a corresponding pixel of the first sharpened image $I_{S1}$ according to the pixel values temporally stored in the line buffers 110a-110f and the pixel values temporally stored in the additional line buffer.

In addition, the first sharpness circuit 104 can perform a vertical sharpening of 6 taps or of other numbers of taps. The number of line buffers utilized by the image processing circuit 100 is determined according to the maximum number of taps of sharpening the first sharpness circuit 104 can perform. Because the image processing circuit 100 of this embodiment has 6 line buffers 110a-110f, the first sharpness circuit 104 can perform a 7-tap vertical sharpening. If the image processing circuit 100 has only 4 of the 6 line buffers 110a-110f, the first sharpness circuit 104 can perform a 5-tap vertical sharpening. In short, in an embodiment of the present invention, the maximum number of sharpening taps the first sharpness circuit 104 can perform is greater than the number of line buffers by one. Please note that 4 or 6 line buffers are not a necessary limitation of the present invention. In fact, the image processing circuit 100 can have any number of line buffers.

Figure 7:
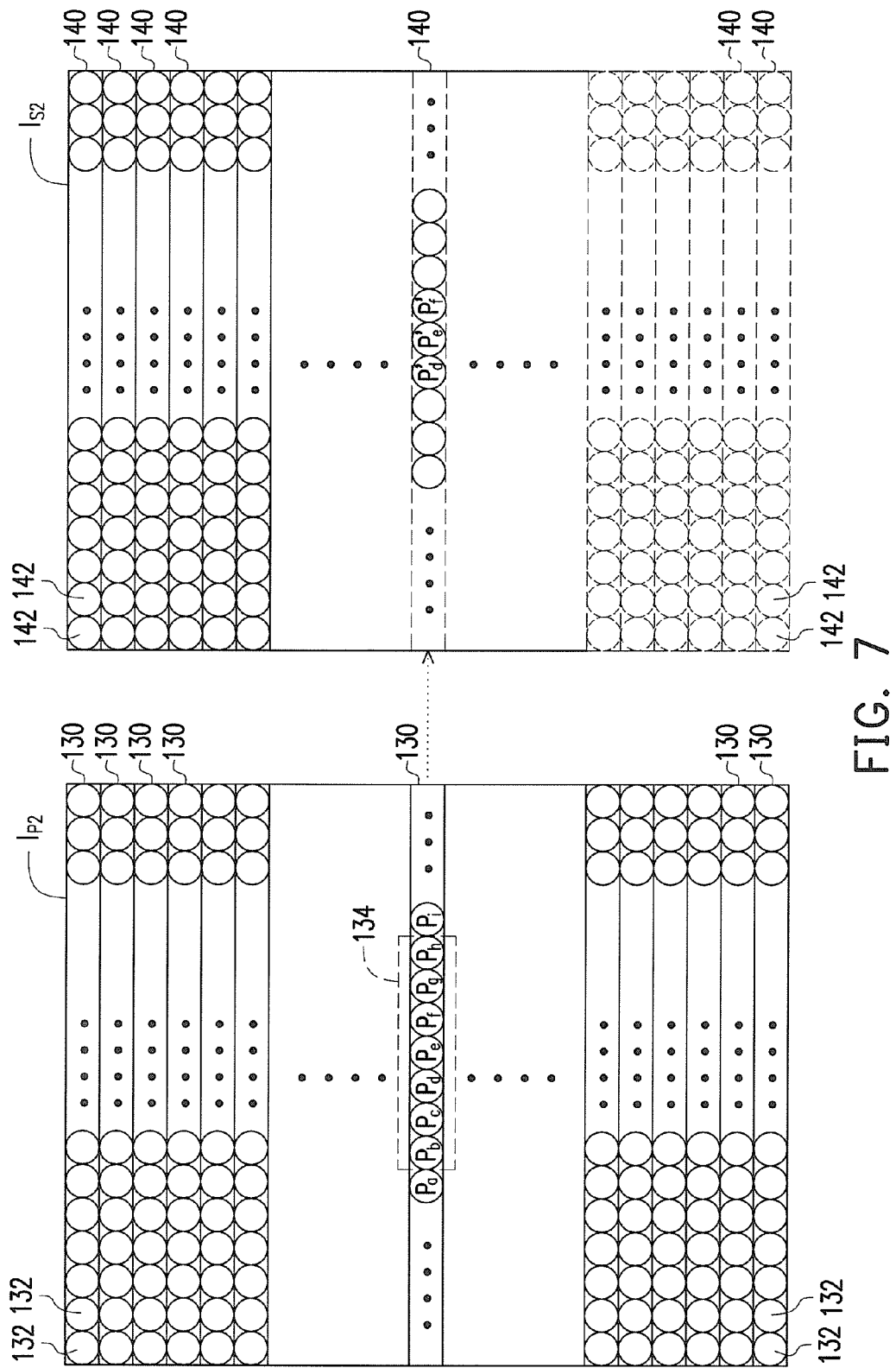
FIG. 7 is a diagram illustrating how the second sharpness circuit of FIG. 3 horizontally sharpens the second enlarged image to generate the second sharpened image.

Please refer to FIG. 7, which is a diagram illustrating how the second sharpness circuit of FIG. 3 horizontally sharpens the second enlarged image $I_{P2}$ to generate the second sharpened image $I_{S2}$. As mentioned, the resolution of the second enlarged image $I_{P2}$ is equal to the resolution of the second sharpened image $I_{S2}$. Assume that the resolutions of the second enlarged image $I_{P2}$ and the second sharpened image $I_{S2}$ are both 1920×1080. A plurality of pixels 132 on the second enlarged image $I_{P2}$ form 1080 pixel rows 130. A plurality of pixels 142 on the second sharpened image $I_{S2}$ form 1080 pixel rows 140. Each pixel row 130 or 140 includes 1920 pixels.

While the second scaling circuit 106 is generating the second enlarged image $I_{P2}$, the second sharpness circuit 108 can calculate the pixel values of a part of pixels on the second sharpened image $I_{S2}$ according to the already generated pixel values of a part of pixels on the second enlarged image $I_{P2}$. As is shown in FIG. 7, the pixel $P_e'$ is the one that the second sharpness circuit 108 is processing. The pixels 142 ahead of the pixel $P_e'$, which are represented by circles of real-lines, are the pixels that have been processed by the second sharpness circuit 108 already. The pixels 142 behind the pixel $P_e'$, which are represented by circles of dotted-lines, are the pixels that are going to be processed by the second sharpness circuit 108. When horizontally sharpening the second enlarged image $I_{P2}$, the second sharpness circuit 108 calculates the pixel values of a pixel 142 on a pixel row 140 of the second sharpened image $I_{S2}$ according to the pixel values of a plurality of pixels 132 on the same pixel row 130 of the second enlarged image $I_{P2}$. For example, the second sharpness circuit 108 calculates the pixel vales of the pixels 142 on the first pixel row 140 of the second sharpened image $I_{S2}$ according to the pixel vales of the pixels 132 on the first pixel row 130 of the second enlarged image $I_{P2}$. The second sharpness circuit 108 calculates the pixel vales of the pixels 142 on the second pixel row 140 of the second sharpened image $I_{S2}$ according to the pixel vales of the pixels 132 on the second pixel row 130 of the second enlarged image $I_{P2}$. And so on.

Assume that the second sharpness circuit 108 performs a 7-tap horizontal sharpening on the second enlarged image $I_{P2}$. To calculate the pixel values of a pixel on the second sharpened image $I_{S2}$, the second sharpness circuit 108 has to use the pixel values of 7 pixels 132 on the same pixel row of the second enlarged image $I_{P2}$. As is shown in FIG. 7, the second sharpness circuit 108 selects some pixels 132 from a processing window 134 to perform the 7-tap horizontal sharpening. Normally, the processing window 134 includes 7 pixels 132 on the same pixel row 130. Among the 7 pixels 132, the pixel 132 that locates in the middle of the processing window 134 corresponding to the pixel 142 that the second sharpness circuit 108 is currently processing. For example, when the second sharpness circuit 108 is calculating the pixel value of the pixel $P_e'$ on the second sharpened image $I_{S2}$, the 7 pixels within the processing window 134 are $P_b$, $P_c$, $P_d$, $P_e$, $P_f$, $P_g$, and $P_h$. The pixels $P_b$, $P_c$, $P_d$, $P_e$, $P_f$, $P_g$, and $P_h$ are on the same pixel row 130. At this moment, the second sharpness circuit 108 calculates the pixel value of the pixel $P_e'$ according to the pixel values of the pixels $P_b$, $P_c$, $P_d$, $P_e$, $P_f$, $P_g$, and $P_h$ within the processing window 134. The locations of the pixels $P_d$, $P_e$, and $P_f$ on the second enlarged image $I_{P2}$ correspond to the locations of the pixels $P_d'$, $P_e'$, and $P_f'$ on the second sharpened image $I_{S2}$, respectively. In addition, the pixel value of the pixel $P_d'$ is calculated according to the pixel values of the pixels $P_a$, $P_b$, $P_c$, $P_d$, $P_e$, $P_f$, and $P_g$; the pixel value of the pixel $P_f'$ is calculated according to the pixel values of the pixels $P_c$, $P_d$, $P_e$, $P_f$, $P_g$, $P_h$, and $P_i$.

While the second sharpness circuit 108 is horizontally sharpening the second enlarged image $I_{P2}$, the processing window 134 moves from left to right within the same pixel row 130. After the second sharpness circuit 108 finishes calculating all the pixel values on a pixel row 140, the processing window 134 moves to the leftest part of the next pixel row 140. While the second sharpness circuit 108 is processing the pixels 142 on the two sides of a pixel row 140, the processing window 134 extends beyond the second sharpened image $I_{S2}$. The number of pixels lie within the processing window 134 will be between 4 and 6, which is less than 7. Even when the pixels lie within the processing window 134 is less than 7, the second sharpness circuit 108 still calculates the pixel values of the pixels 142 on the two sides of a pixel row 140 according to the pixel values of the pixels 132 lie within the processing window 134.

In the above embodiment, the second sharpness circuit 108 performs a 7-tap horizontal sharpening. However, this is not a necessary limitation of the present invention. The second sharpness circuit 108 can perform a horizontal sharpening of any number of taps. The number of pixels covered by the processing window 134 can be adjusted according to the number of taps. For example, if the second sharpness circuit 108 performs a 9-tap horizontal sharpening, the processing window 134 can cover 9 pixels 132.

Please refer to FIG. 3. The image processing circuit 100 not only can enlarge and sharpen images, but also can sharpen without enlarging images. For example, if the resolution of the input image $I_{IN}$ is already 1920×1080, rather than enlarging the input image $I_{IN}$, the first scaling circuit 102 can directly send the input image $I_{IN}$ to the line buffers 110a-110f. The first sharpness circuit 104 vertically sharpens the input image $I_N$ according to the data stored in the line buffers 110a-110f to generate the first sharpened image $I_{S1}$. Then, rather than enlarging the first sharpened image $I_{S1}$, the second scaling circuit 106 can directly send the first sharpened image $I_{S1}$ to the second sharpness circuit 108. The second sharpness circuit 108 horizontally sharpens the first sharpened image $I_{S1}$ to generate the second sharpened image $I_{S1}$. Please note that while the first sharpness circuit 104 is vertically sharpening the input image $I_{IN}$, each three line buffers 110a-110c and 110d-110f will store the pixel values of a pixel row of the first sharpened image $I_{S1}$. Specifically, the data volume of a pixel row of the 1920×1080 input image $I_{IN}$ is 5760 (i.e. 1920×3) bytes. Because the data length of each of the line buffers 110a-110f is 2160 (i.e. 720×3) bytes, three line buffers will be required to store the pixel values of a pixel row of the first sharpened image $I_{S1}$. The six line buffers 110a-110f can store the pixel values of two pixel rows of the first sharpened image $I_{S1}$. In the circumstances, the first scaling circuit 102 can perform a 3-tap vertical sharpening on the 1920×1080 input image $I_{IN}$.

The present invention divides the image scaling into a vertical scaling and a horizontal scaling, and divides the image sharpening into a vertical sharpening and a horizontal sharpening. The vertical sharpening is performed after the vertical scaling and before the horizontal scaling. Therefore, the image processing circuit of the present invention can use line buffers with shorter data lengths to perform the vertical sharpening. The vertical sharpening of the invention can be performed with more taps without requiring line buffers of longer data lengths.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An image processing circuit for processing an input image, the image processing circuit comprising:
    a first scaling circuit, for increasing a resolution along a first direction of the input image to generate a first enlarged image;
    a first sharpness circuit, for sharpening the first enlarged image along a second direction to generate a first sharpened image;
    a second scaling circuit, coupled to the first sharpness circuit, for increasing a resolution along a third direction of the first sharpened image to generate a second enlarged image; and
    a second sharpness circuit, coupled to the second scaling circuit, for sharpening the second enlarged image along a fourth direction to generate a second sharpened image.

2. The image processing circuit of claim 1, further comprising one or more line buffers, coupled to the first scaling circuit, for temporally storing the pixel values of a plurality of pixel rows of the first enlarged image.

3. The image processing circuit of claim 1, wherein the first direction is equal to the second direction, and the third direction is equal to the fourth direction.

4. The image processing circuit of claim 1, wherein each of the first and second directions is a vertical direction, and each of the third and fourth directions is a horizontal direction.

5. The image processing circuit of claim 1, wherein the first direction is a vertical direction, and the third direction is a horizontal direction.

6. The image processing circuit of claim 1, wherein the second direction is a vertical direction, and the fourth direction is a horizontal direction.

7. An image processing method for processing an input image, the image processing method comprising:
    increasing a first resolution of the input image along a first direction to generate a first enlarged image;

sharpening the first enlarged image along a second direction to generate a first sharpened image;

increasing a second resolution of the first sharpened image along a third direction to generate a second enlarged image; and sharpening the second enlarged image along a fourth direction to generate a second sharpened image.

8. The image processing method of claim 7, further comprising:

temporally storing the pixel values of a plurality of pixel rows of the first enlarged image into one or more line-buffers of the image processing circuit.

9. The image processing method of claim 7, wherein the first direction is equal to the second direction, and the third direction is equal to the fourth direction.

10. The image processing method of claim 7, wherein each of the first and second directions is a vertical direction, and each of the third and fourth directions is a horizontal direction.

11. The image processing circuit of claim 7, wherein the first direction is a vertical direction, and the third direction is a horizontal direction.

12. The image processing circuit of claim 7, wherein the second direction is a vertical direction, and the fourth direction is a horizontal direction.

* * * * *